(12) United States Patent
Pelton

(10) Patent No.: US 12,216,989 B2
(45) Date of Patent: Feb. 4, 2025

(54) SYSTEM AND METHOD FOR TRACKING AND MANAGING DATA FROM A REMOTE DATABASE

(71) Applicant: Erik M. Pelton & Associates, PLLC, Falls Church, VA (US)

(72) Inventor: Erik Pelton, Falls Church, VA (US)

(73) Assignee: ERIK M. PELTON & ASSOCIATES, PLLC, Falls Church, VA (US)

( * ) Notice: Subject to any disclaimer, the term of this patent is extended or adjusted under 35 U.S.C. 154(b) by 0 days.

(21) Appl. No.: 18/205,780

(22) Filed: Jun. 5, 2023

(65) Prior Publication Data
US 2023/0394231 A1    Dec. 7, 2023

Related U.S. Application Data

(60) Provisional application No. 63/349,306, filed on Jun. 6, 2022.

(51) Int. Cl.
| | |
|---|---|
| G06F 40/174 | (2020.01) |
| G06F 16/51 | (2019.01) |
| G06F 16/81 | (2019.01) |
| G06F 40/143 | (2020.01) |
| G06F 40/221 | (2020.01) |

(52) U.S. Cl.
CPC ............ *G06F 40/174* (2020.01); *G06F 16/51* (2019.01); *G06F 16/81* (2019.01); *G06F 40/143* (2020.01); *G06F 40/221* (2020.01)

(58) Field of Classification Search
CPC ........ G06F 16/81; G06F 16/51; G06F 40/174; G06F 40/143; G06F 40/221
See application file for complete search history.

(56) References Cited

U.S. PATENT DOCUMENTS

| | | | | |
|---|---|---|---|---|
| 2003/0100995 | A1* | 5/2003 | Loraine | ................... G16B 50/00 |
| | | | | 702/19 |
| 2005/0166094 | A1* | 7/2005 | Blackwell | ........... G06F 11/3664 |
| | | | | 714/38.14 |
| 2008/0201159 | A1* | 8/2008 | Gabrick | ................... G06F 16/93 |
| | | | | 707/999.107 |
| 2009/0024647 | A1* | 1/2009 | Hein | ....................... G06F 16/25 |
| | | | | 707/999.102 |

(Continued)

OTHER PUBLICATIONS

International Search report PCT/US2023/24449 dated Sep. 1, 2023 and written opinion (pp. 1-20).

*Primary Examiner* — Tadesse Hailu
(74) *Attorney, Agent, or Firm* — Millen, White, Zelano & Branigan P.C.; William F. Nixon

(57) ABSTRACT

A method and a system for tracking and managing data is disclosed. The method and system compile the tracked data into a user-accessible message and sends the user-accessible message to a subscriber periodically. A tracking device tracks selected data stored in at least one database and sends the tracked selected data to a user database. A data compiling device receives the tracked selected data and compiles the tracked selected data into a pre-determined form. The pre-determined form is then sent to the subscriber in an email or a cellular text message. The data stored in the at least one database includes image data and content data. The data is frequently updated to contain new files and new status of existing content data.

20 Claims, 9 Drawing Sheets

(56) References Cited

U.S. PATENT DOCUMENTS

2015/0363414 A1* 12/2015 Acharyya ........... G06F 11/1464
707/821
2021/0279829 A1 9/2021 Tillman et al.
2021/0303643 A1 9/2021 Lundberg et al.
2022/0319219 A1* 10/2022 Tsibulevskiy ........ G06V 30/226

* cited by examiner

SYSTEM AND METHOD FOR TRACKING AND MANAGING DATA FROM A REMOTE DATABASE

FIELD OF THE INVENTION

The present invention relates to a method for tracking data from a remote database and for compiling the tracked data into a user-accessible document. More particularly, the present invention relates to the data management system for tracking data and processing the tracked data to compile into the user-accessible document.

DESCRIPTION OF THE RELATED ART

Technologies of tracking data may be used in the industry for improving business performance. Based on selected metrics and events that matter most to the business, a tracking method monitors and collects data related to the selected metrics and events, organizes the collected data and analyzes the data. The resulting data can then be applied to the business's strategies in order to improve business performance, customer experience, and so on.

Data tracking and collection are often performed with cookies and/or Javascript libraries. The tracking method may collect data from the web pages a customer browses or based on the customer's account. The collected data is then organized and analyzed and the result will be sent to a data processing system for further use.

Currently, the data tracking is commonly used for commercial purposes. For example, based on the webpage browsing history made by a customer, the system will display pop-up commercials that may interest the customer when the customer connects to an internet. Data tracking can also be used to track and collect information that may be useful to the customer. These methods, however, do not provide a user with accessible and editable document. Thus, a more efficient way to organize the collected data so as to compile such data into user-interactive applications is desirable.

SUMMARY OF THE INVENTION

A method for compiling data into user-applicable information is disclosed. The method comprises monitoring selected data stored in at least one database, wherein the data includes image data and content data, and wherein the selected data is chosen based on user's inputs. The method further retrieves the selected data at a predetermined time, compiles the retrieved data into a template form, composes the complied template form or document into a user-accessible message, and sends the message to associated users.

When the step of retrieving at the predetermined time fails, the method further comprises retrying to retrieve the selected data at a predetermined time period. The message may be sent to the associated users through an email or a cellular message and may be sent at a predetermined time of a day.

A system for tracking and managing data is also disclosed. The system comprises a tracking device connecting with at least one database for tracking selected data stored in the at least one database, wherein the selected data is determined by user's inputs and includes image data and content data, a data compiling device for receiving the tracked selected data from the tracking device and for compiling the tracked selected data to a pre-determined form or document, and an output device for sending the pre-determined form after being compiled to a subscriber.

The system may further connect and track data stored in a user's database. The compiling device, in addition to compiling the tracked selected data, may also compile data tracked in the user's database into the pre-determined form or document. The pre-determined form is later sent to the user so that the user may access information saved in the compiled form or document. The system tracks and processes the data periodically or at a predetermined time. Therefore, the compiled form/document is updated regularly.

A method for managing data is disclosed. The method includes downloading an update file from a remote server to a tracking device having a tracker and a tracker database. The remote server includes a case file database and an image file database. The method also includes parsing the update file using the tracker. The tracker includes a first entry used to identify a first case file within the update file. The first entry also is found within the tracker database. The method also includes identifying the first case file within the update file using the first entry. The method also includes receiving a first bundle file of the first case file in the case file database in response to the first request. The first bundle file includes XML data from the case file database and image data corresponding to the first case file from the image file database. The method also includes populating the first entry in the tracker database with the XML data and the image data within the first bundle file. The method also includes populating an electronic form with the XML data and the image data. The method also includes sending an electronic notification including the electronic form having the XML data and the image data.

A data management system is disclosed. The data management system includes a processor. The data management system also includes a memory connected to the processor. The memory stores instructions that, when executed on the processor, configure the data management system to download an update file from a remote server to a tracking device having a tracker and a tracker database. The remote server includes a case file database and an image file database. The instructions also configure the data management system to parse the update file using the tracker. The tracker includes a first entry used to identify a first case file within the update file. The first entry also is found within the tracker database. The instructions also configure the data management system to identify the first case file within the update file using the first entry. The instructions also configure the data management system to send a first request from the tracker to the case file database and the image file database. The first request includes information associated with the first entry. The instructions also configure the data management system to receive a first bundle file of the first case file in the case file database in response to the first request. The first bundle file includes XML data from the case file database and image data corresponding to the first case file from the image file database. The instructions also configure the data management system to populate the first entry in the tracker database with the XML data and the image data within the first bundle file. The instructions also configure the data management system to populate an electronic form with the XML data and the image data. The instructions also configure the data management system to send an electronic notification including the electronic form having the XML data and the image data.

A data management method is disclosed. The data management method includes sending an update request to a remote server from a tracking device at a specified time. The remote server includes a case file database and an image file database. The data management method also includes downloading an update file in response to the update request from the remote server to the tracking device. The tracking device includes a tracker and tracker database. A data size of the update file is greater than 1 gigabyte. The data management method also includes parsing a plurality of case files in the update file using the tracker. The tracker includes a plurality of entries to identify a set of the plurality of case files. The plurality of entries is found within the tracker database. The data management method also includes generating a first request for a first entry within the plurality of entries that corresponds to a first case file of the set of case files identified from the update file by the tracker. The data management method also includes generating a second request for a second entry with the plurality of entries that corresponds to a second case file of the set of cases identified from the update file by the tracker. The data management method also includes sending a first request from the tracker to the remote server having the case file database and the image file database. The first request includes a first key to access the first case file at the remote server. The data management method also includes implementing a delay after the first request is sent to the remote server. The data management method also includes, after the delay, sending a second request from the tracker to the remote server having the case file database and the image file database. The second request includes a second key to access the second case file at the remote server. The data management method also includes receiving a first bundle file of the first case file in the case file database in response to the first request and the first key. The first bundle file includes XML data from the case file database and image data corresponding to the first case file from the image file database. The data management method also includes receiving a second bundle file of the second case file in the case file database in response to the second request and the second key. The second bundle file includes XML data from the case file database and image data corresponding to the second case file from the image file database. The XML data and the image data of the first bundle differ from the XML data and the image data of the second bundle file. The data management method also includes populating the first entry in the tracker database with the XML data and the image data within the first bundle file. The data management method also includes populating the second entry in the tracker database with the XML data and the image data within the second bundle file. The data management method also includes generating a first electronic form with the XML data and the image data within the first bundle file. The data management method also includes generating a second electronic form with the XML data and the image data within the second bundle file. The data management method also includes sending a first electronic notification including the first electronic form having the XML data and the image data within the first bundle file to a first recipient. The data management method also includes sending a second electronic notification including the second electronic form having the XML data and the image data within the second bundle file to a second recipient. The first recipient differs from the second recipient.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The preferred embodiments of the present invention relate to a system and a method for tracking data located at a public database or a private database, retrieving tracked data, compiling the tracked data into a user-accessible form, and sending such a user-accessible form to subscribers. According to the preferred embodiments, the system and method tracks selected data periodically based on inputs of the subscribers and the tracked selected data includes image data and content data. The tracking and retrieving processes may be executed at a pre-determined time of a day or any pre-determined times of a week or so on. The user-accessible form is a general term that includes a table, a spreadsheet, a word document, a PDF file, or a video clip. The user-accessible form may be sent to subscribers or users via an email or a mobile text. The public database may be any database accessible by the public and the data stored in the database is frequently updated. One example of the public database is a database of the US Patent and Trademark Office (USPTO) which stores patent and trademark information. The private database may be a database associated with the subscribers or users and can only be accessed by authorized personnel.

Figure 1:
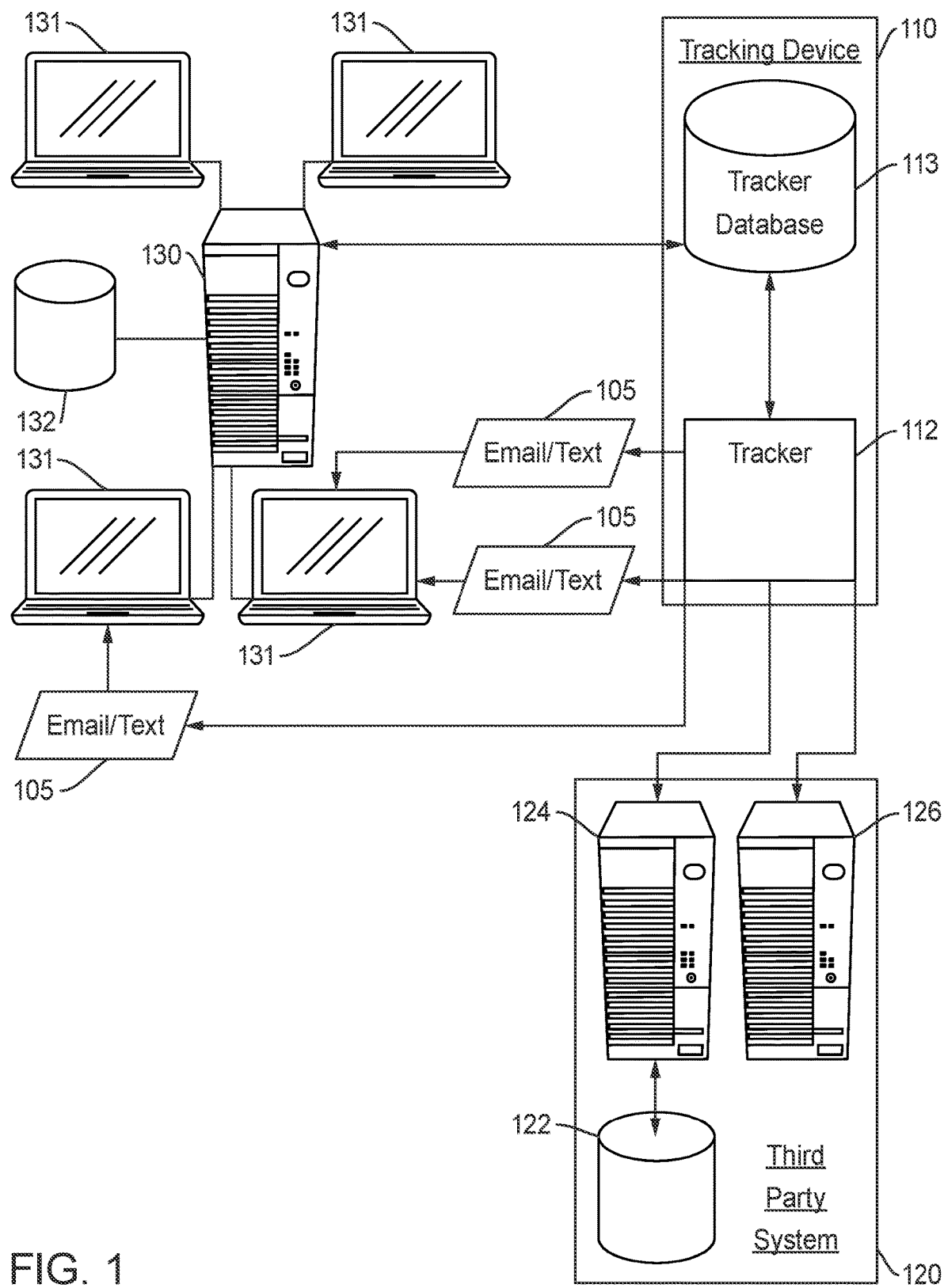
FIG. 1 illustrates a schematic block diagram of a managing system for tracking data and compiling tracked data into a user-accessible form in accordance with the disclosed embodiments.

FIG. 1 is a schematic diagram of a data management system 100 for tracking data and compiling tracked data into a user-accessible form in accordance with the disclosed embodiments. As illustrated, management system 100 includes a tracking device 110, a third party system 120 including remote database 122 to be tracked by tracking device 110, and a web server 130 connecting to a plurality of user devices 131 for receiving messages 105 from tracking device 110 and distributing the messages to at least one of the plurality of user devices 131. In a disclosed embodiment, as an example, third party system 120 includes a USPTO website and database 122 to be tracked as a public database supported by USPTO. Data stored in database 122 is frequently updated to contain new files and new status of existing content data. Database 122 may be a remote database as it is outside tracking device 110. Database 122 also may be referred to as a third party database or public database as the information within the database is available to the public.

Tracking device 110 includes a tracker 112 for tracking selected data stored in public database 122. The selected data may be from a public source, which includes large amounts of data, such as greater than 1 gigabyte in a zip format. For example, tracker 112 tracks data relating to trademark applications/registered trademarks including trademark statuses and document retrieval data 124 and image data 126 of the trademarks. Tracker 112 may also track data regarding patent applications/patents. The tracked data may include data of statuses of the trademark and patent applications, such as filing dates, publication dates, issued dates of office actions, allowance dates, marked images, issue dates, and so on. The data may include text data and image data. The image data is not of a consistent format. Tracker 112 is disclosed in greater detail below by FIG. 5.

Tracking device 110 may be a computing device located at a virtual dedicated server, that tracks data stored in database 122 using Java or PHP software, or appropriate software that is designed to run on any hardware and can be ported to, for example a Unix/Linux operating system and the database can be migrated to MS SQL Server/Oracle with minimal effort. As noted, tracking device 110 may be hosted by a virtual dedicated server to provide an Infrastructure as a Service (IaaS) platform that allows users or companies to provision an isolated server over data management system 100. Tracking device 110 may be provided to one entity for performing the operations disclosed below and may not be shared with other customers.

According to the disclosed embodiments, tracking device 110 further includes a tracker database 113 for storing data that is tracked and retrieved by tracker 112. Once the data is tracked and retrieved by tracker 112, tracker 112 compiles the tracked data into user-accessible form stored in tracker database 113 or a separate database. The user-accessible form may be a pre-set form or customer-designed form that includes information to be filled by the tracked data. The user-accessible form, after compiled, may be further loaded to an email or a cellular message 105 to be sent to web server 130. Tracker database 113 may be located in a server separated from tracker 112, such as MySQL server. Web server 130 may be an Apache server using PHP programming language that works with Apache to help create dynamic web content. Apache is a web server that processes requests and serves web assets and content via HTTP.

In the disclosed embodiments, web server 130 may be a server within a company or an organization and the plurality of client devices 131 are located within a domain of the web server 130. The web server 130 may also be a remote server, such as a cloud-based server, that can track data and distribute the tracked data through a network to a processor located in the domain of a company or organization for compiling into a user-accessible form. The user-accessible form may be stored in a database associated with the company or the organization. According to the disclosed embodiments, the email or cellular message 105 containing the compiled form may be sent to the web server 130. The web server 130 distributes the messages to the plurality of client devices 131 periodically or on scheduled time. In alternative disclosed embodiments, each of the plurality of client devices 131 may have a unique identification (ID) associated to a subscriber/user. The email or cellular message is sent to the client devices 131 in an html standard and may include a destination code associated with one or more user's IDs. Web server 130 then distributes the received message to appropriate user devices based on the destination code of the messages.

In addition to tracking the selected data stored in database 122, tracking device 110 may also track data stored in a private database 132 associated with the web server 130. The data may include docket information of cases the subscriber user is working on, email communications between the subscribe user and his/her client regarding to the cases, the subscriber user's work calendar, and the like. According to the disclosed embodiments, both the tracked data from public database 122 and private database 132 may be saved in tracker database 113. Also, tracking device 110 may compile both the tracked data into the user-accessible form.

FIG. 1 only shows one web server 130 that receives the messages with user-accessible forms from tracking device 110. It is noted that there may be a plurality of web servers and domains within data management system 100. Tracking device 110 may track selected data based on requirements received from different web servers and compile different user-accessible forms in the same manner as described above with reference to FIG. 1.

The plurality of client devices 131 may be one or more computing devices capable of receiving user input as well as transmitting or receiving data within data management system 100. In some embodiments, a client device 131 is a conventional computer system, such as a desktop or laptop computer. Alternatively, a client device 131 may be a device having computer functionality, such as a personal digital assistant (PDA), a mobile telephone or tablet, a smartphone, and the like. A client device 131 is configured to communicate via data management system 100. In some embodiments, a client device 131 executes an application allowing a user of the client device to interact with tracking device 110.

For example, a client device 131 executes a browser application to enable interaction between the client device 131 and tracking device 110 via data management system 100. In another embodiment, client device 131 interacts with tracking device 110 through an application programming interface (API) running on a native operating system of the client device.

The plurality of client devices 131 are configured to communicate via data management system 100, which may include any combination of local area or wide area networks, using both wired or wireless communication systems. In some embodiments, data management system 100 used standard communication techniques or protocols. For example, data management system 100 includes communication links using technologies such as Ethernet, 802.11, worldwide interoperability for microwave access (WiMAX), 3G, 4G, 5G, 6G, code division multiple access (CDMA), digital subscriber lines (DSL), and the like. Examples of networking protocols used for communicating via data management system 100 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over data management system 100 may be represented using any suitable format, such as hypertext markup language (HTML) or extensible markup language (XML). In some embodiments, all or some of the communication links of data management system 100 may be encrypted using any suitable technique or techniques.

Third party system 120 may be coupled to data management system 100 for communicating with tracking device 110. In some embodiments, third party system 120 is an application provider to provide data or content for presentation via a client device 131. Third party system 120 also may communicate information to tracking device 110, as disclosed above. Tracking device 110 uses the data from third party system 120, specifically from database 122, to populate tracking database 113 after processing operations are completed on the received data.

Figure 2:
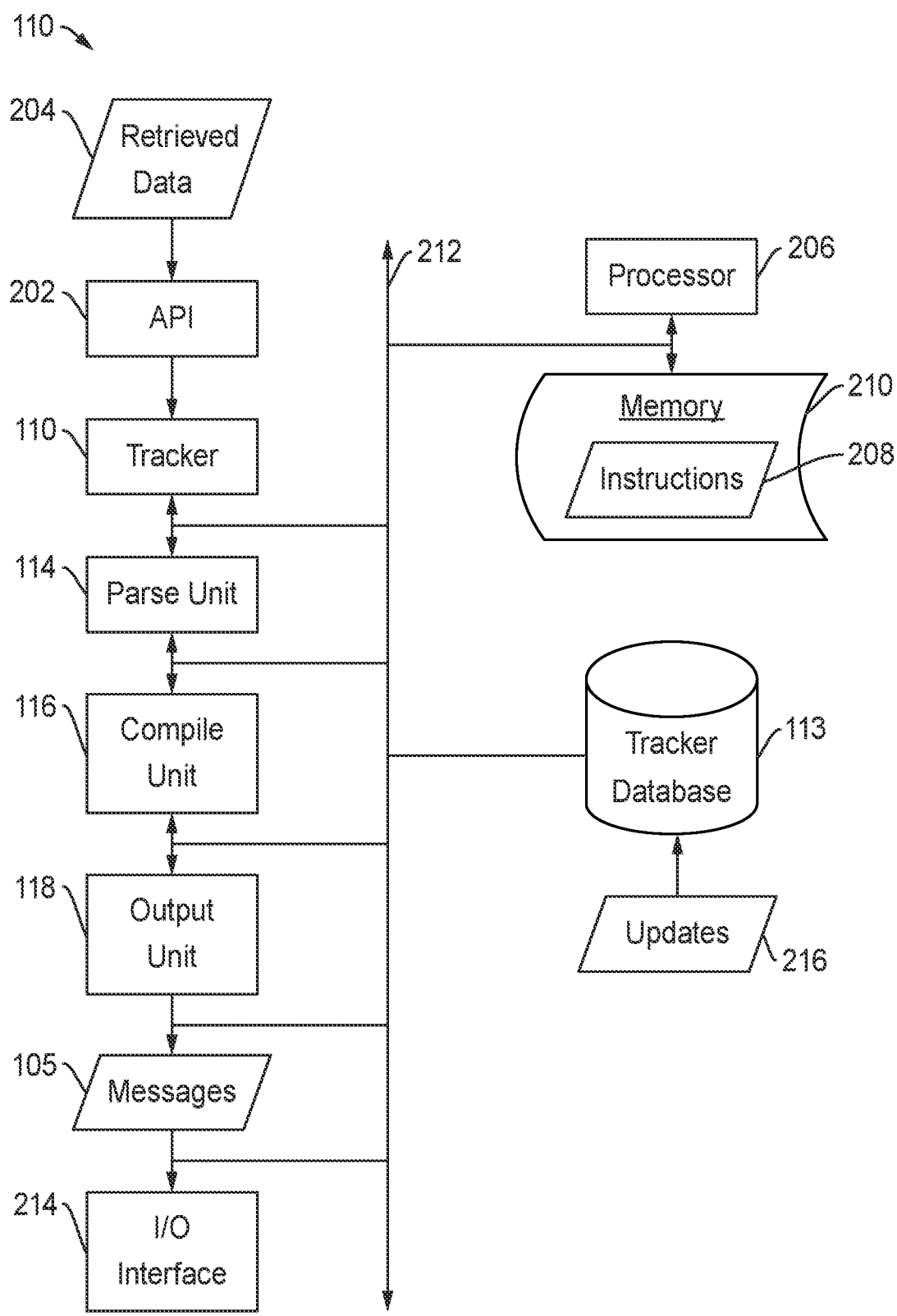
FIG. 2 is a schematic block diagram of tracking device according to the preferred embodiments.

FIG. 2 is a schematic block diagram of tracking device 110 according to the disclosed embodiments. Tracking device 110 includes a processor 206 that executes instructions 208 stored in memory 210. Instructions 208 configure processor 206 to execute the functions and process disclosed below. For example, instructions 208 may configure processor 206 to launch tracker 110, parse unit 114, compile unit 116, and output unit 118 as well as retrieve data and information from tracker database 113. Data and instructions to the various components within tracking device 110 may be communicated along communication bus 212.

In addition to tracker 112 as illustrated in FIG. 1, tracking device 110 further includes a parse unit 114, a compile unit 116 and an output unit 118. Tracker 112 connects and tracks data stored in a database, such as databases 122 and 132, as shown in FIG. 1. Tracker 110 may download publicly available data via API 202. Tracker 112 may call to database 122 at a set time every day, week, and the like. Alternatively, tracker 112 may use API 202 to download retrieved data 204 when requested by tracking device 110. Tracking device 110 may receive an instruction through data management system 100 from a client device 131 to download retrieved data 204.

Retrieved data 204 may be a file that includes a summary update of all active matters in database 122. For example, the active matters may be trademark application matters that change frequently. Data, or files, associated with the matters are updated. Retrieved data 204 may be a large data file, larger than 2 gigabytes, uncompressed. In some embodiments, retrieved data 204 may be an XML file.

Parse unit 114 receives tracked data from tracker 112 and parses the tracked data to be sent to compile unit 116. The disclosed embodiments parse through the XML file of retrieved data 204 and extracts updates 216 that are pertinent to entries within tracker database 113. These updates 216 are recorded into tracker database 113.

Compile unit 116 then compiles the tracked data, shown as retrieved data 204, into a user-accessible form by filling data required by the user-accessible form. To automatically fill out the required data of the user-accessible form, parse unit 114 may embed metadata in each of the tracked data that would direct the tracked data to their destinations on the user-accessible form.

After the user-accessible form is fulfilled, compile unit 116 compiles the form into an email or a cellular message 105. Next, output unit 118 sends out the email or cellular message 105 to client devices 131. In an alternative embodiment, the fulfilled user-accessible form is sent to output unit 118 from compile unit 116. Output unit 118 then uploads the user-accessible form to an email or a cellular message 105 and sends the email or cellular message to subscribed users via data management system 100.

According to the preferred embodiments, tracking device 110 may perform tracking and compiling procedures at a pre-determined time every day or every several days, depending on the users' requirements which is not limited hereto. The email may be sent to the users by a HTML as an example.

Figure 3:
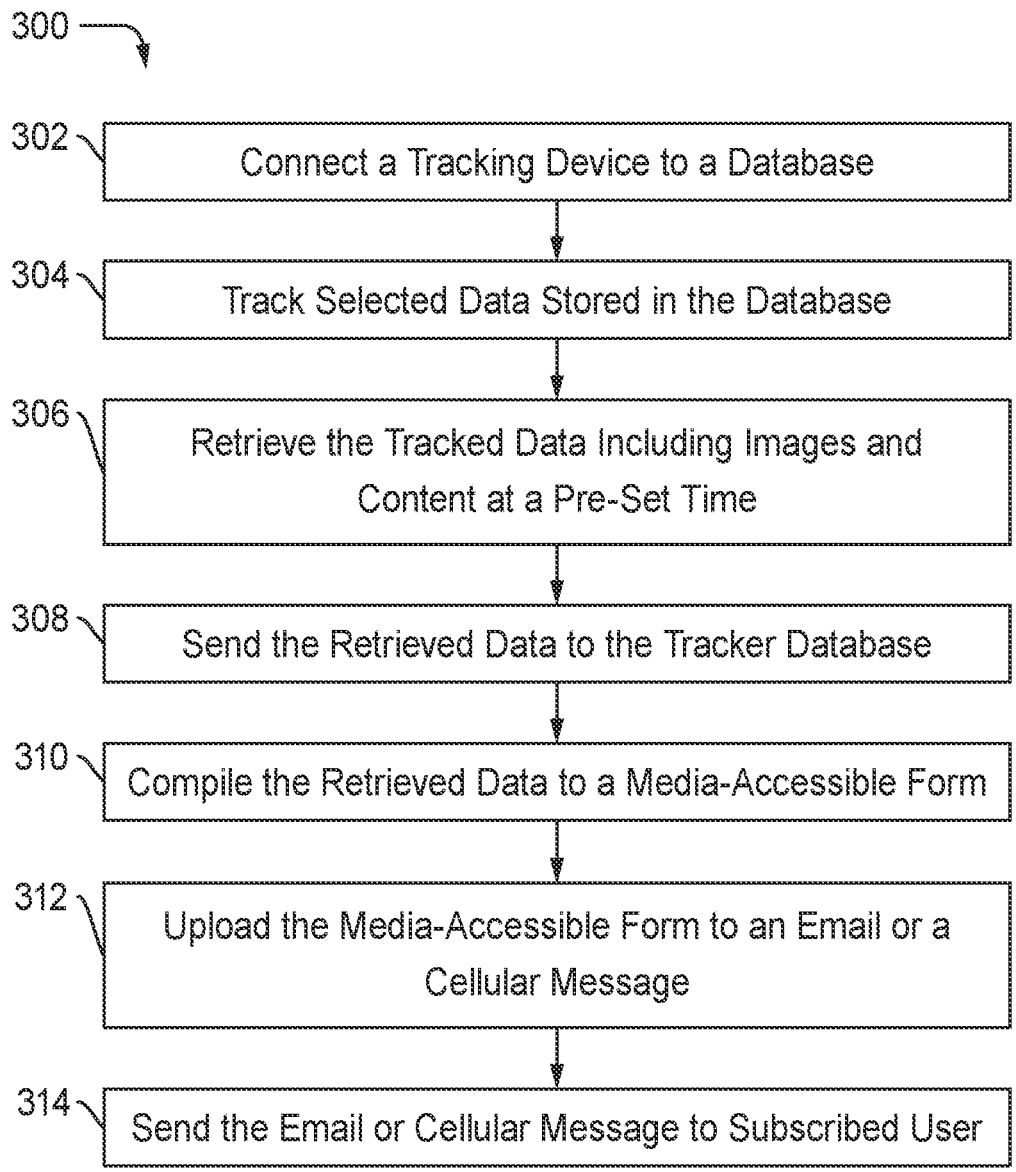
FIG. 3 is a flow chart illustrating a method for tracking data and compiling tracked data into a user-accessible form according to the preferred embodiments.
Figure 4:
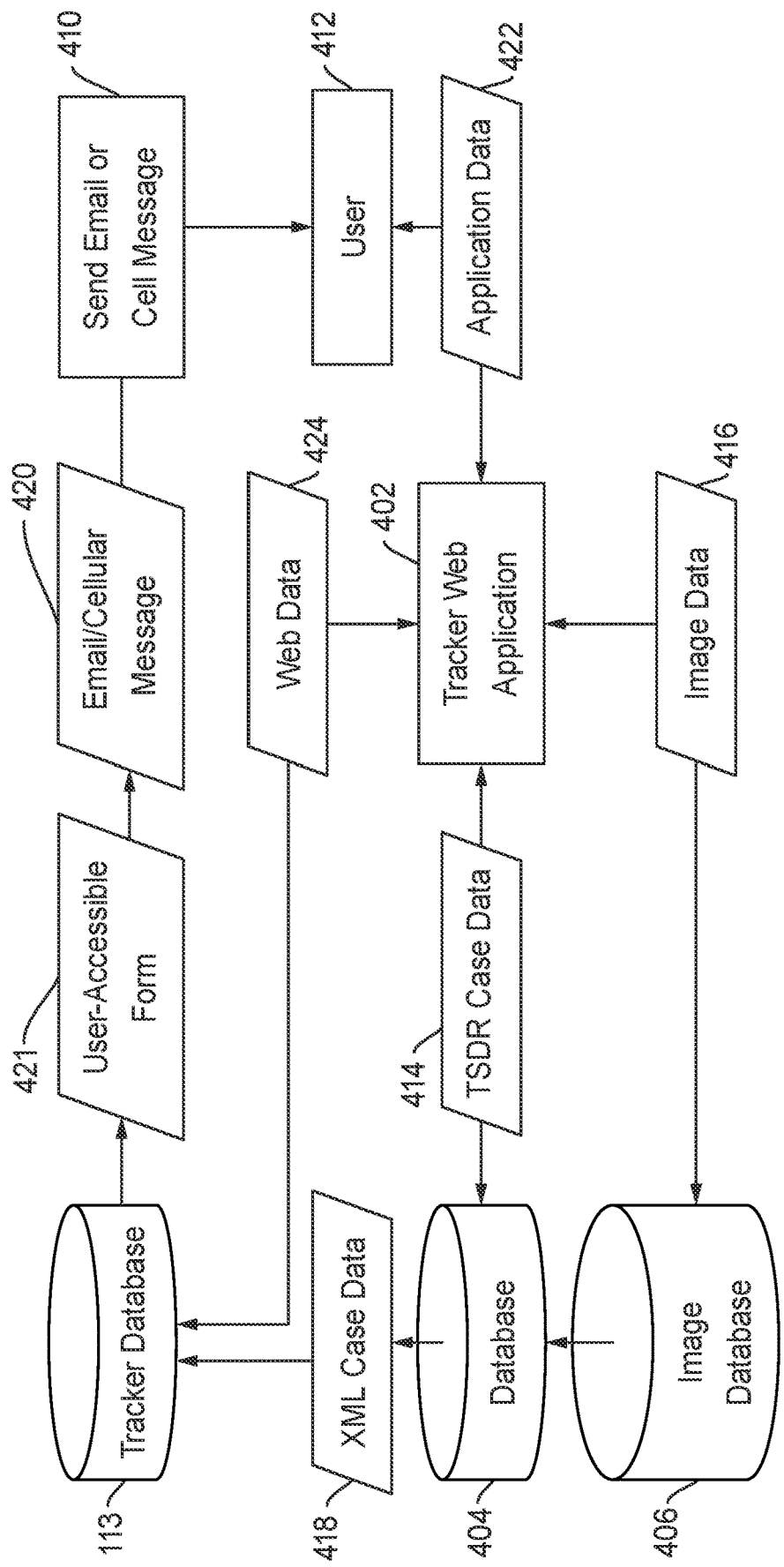
FIG. 4 illustrates a tracking data flow diagram according to the preferred embodiments.

FIG. 3 is a flow chart 300 illustrating a method for tracking data and compiling tracked data into a user-accessible form according to the preferred embodiments. FIG. 4 illustrates a tracking data flow diagram 400 according to the preferred embodiments. FIGS. 3 and 4 will be described together to better explain the disclosed invention. In FIG. 4, the database to be tracked is a database located in the website for illustrative purpose only. A trademark, or USPTO, database or databases may be referenced as these components are examples of databases having files or data and image data. Please note that the database that can be tracked by method 300 is not limited to a patent or trademark database.

In FIG. 3, step 302 executes by connecting a tracking device such as device 110 of FIG. 1 to a designated database. Step 304 executes by tracking selected data stored in the designated database, such as databases 122 and 132 of FIG. 1. The selected data is determined based on inputs chosen by users and may be different for different users.

FIG. 4 shows that in tracking step 304, the method 300 may use a tracker web application 402 to track the selected data, or application data 422. Application data 422 may be data provided by user 412 regarding their account or pending matter within databases 404 and 406. Tracker web application 402 may track either trademark case data (for example) TSDR 414 stored in database 404 or image data 416 stored in image database 406, or both.

Back to FIG. 3, while the method continues tracking selected data from database 404 and image database 406, step 306 executes by retrieving tracked selected data at a scheduled time and step 308 executes by sending the retrieved data to the tracker database, such as database 113 of FIG. 4. The retrieved data may include one of the case data and the image data or both. The case data 418 may be sent to tracker database 113 in an XML standard, as shown in FIG. 4. The retrieved data also may include web data 424 provided by the tracker web application 402.

After the tracked data is sent to the tracker database 113, step 310 executes by compiling the retrieved tracked data to a user-accessible form 421 which is stored in the tracker database 113. Next, step 312 uploads the user-accessible form 421 compiled at step 310 to an email or a cellular message 420, and step 314 executes by sending the email or cellular message (step 410 of FIG. 4) to subscribed users (user 412 of FIG. 4.)

The email or cellular message 420 may be sent to users immediately after step 312 or on a second scheduled time. For example, the method 300 may retrieve and process the tracked data at midnight but does not send the uploaded email or cellular message to the subscribing users until 6 a.m. the same day. Alternatively, the method may retrieve and process the tracked data at midnight and send the uploaded email or cellular message to the subscribed users immediately after the email or cellular message is uploaded with the user-accessible form. Further, the email may be sent to the user 412 in the HTML standard.

After receiving the email, user 412 may download the compiled user-accessible form 421 and is able to review the information contained in the form. The user-accessible form 421 may be a docketing form used in most companies, such as law firms, accounting firms, merchandise selling department, and so on.

Further, the user-accessible form 421 may include a calendar section that when chosen, will show a weekly or monthly calendar of the user's schedules. A report section may be also included in the form which may list statistic information of cases prosecuted in the firm. The user-accessible form may further include administrator command section that lists the names and comments of the administrator.

Figure 5:
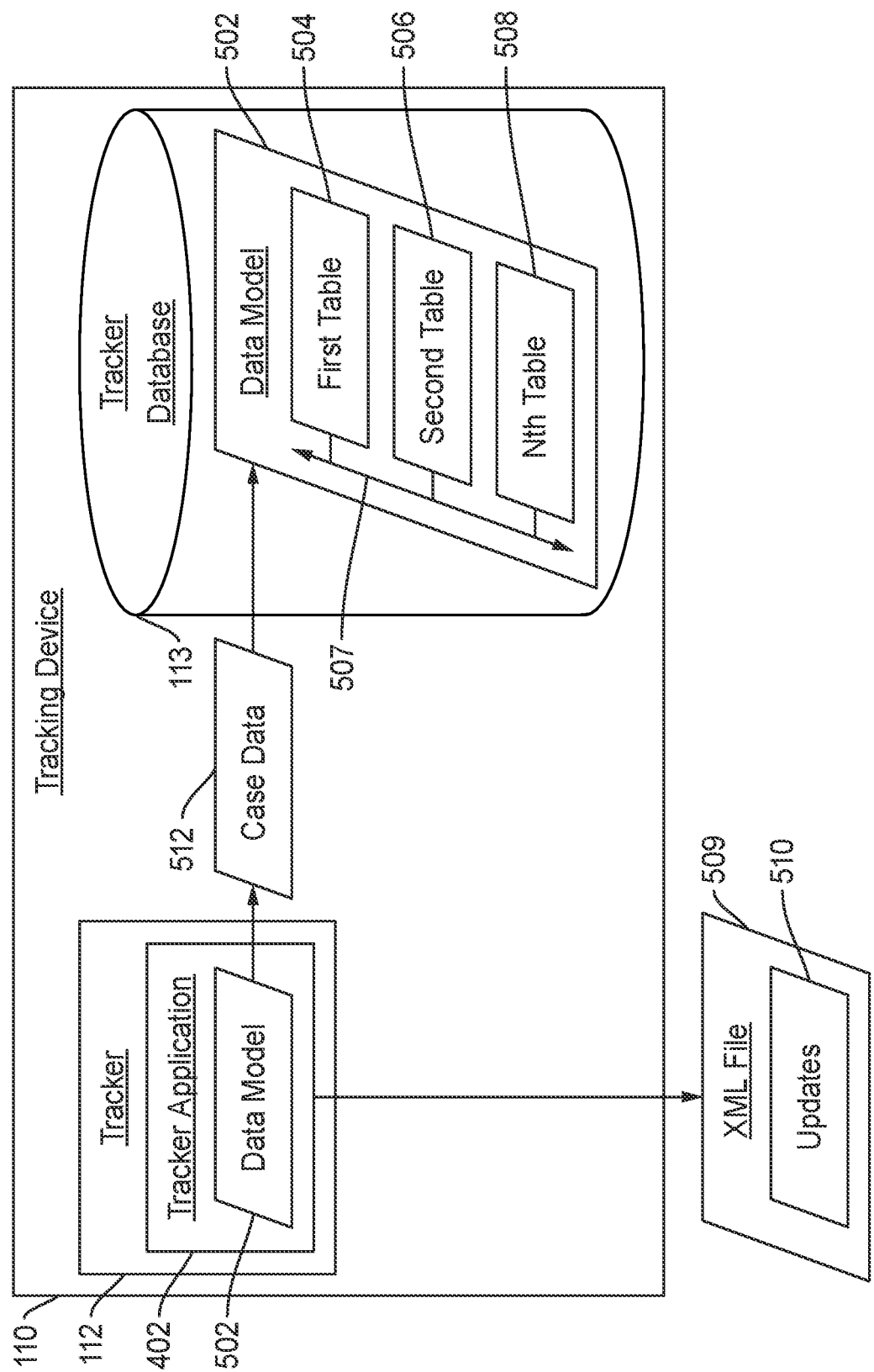
FIG. 5 illustrates a block diagram of a tracker database having a unique configuration for use with a tracker application of a tracker according to the disclosed embodiments.

FIG. 5 depicts a block diagram of a tracker database 113 having a unique configuration for use with a tracker application 402 of tracker 112 according to the disclosed embodiments. Tracker database 113 is configured uniquely in that a data model is logically designed specifically for use by tracker application 402 of tracker 112. The tables and relationships therebetween are configured for maximum efficiency of tracker application 402.

As disclosed above, tracking device 110 includes tracker 112 and tracker database 113. Tracker 112 may include tracker application 402, which may be a web-based application to interface with tracker database 113 and a downloaded XML file 509. XML file 509 may correspond to XML case data 418 in FIG. 4. Tracker application 402 may use data model 502 configured within tracker database 113 to obtain the appropriate data to be provided as case data 512 back to tracker database 113. Essentially, tracker application 402 uses update data 510 provided in XML file 509 to populate the data model for entries within tracker database 113.

As shown in tracker database 113, data model 502 includes tables and relationships specifically configured to let tracker application 402 what to retrieve from XML file 509. For example, data model 502 may include first table 504, second table 506, up to Nth table 508. Data model 502 may include many different tables, all having relationships 507. Relationships 507 may allow different tables to update based on a change in another table. For example, if first table 504 is modified by case data 512 retrieved by tracker application 402, then second table 506 is updated accordingly using relationships 507.

Thus, data model 502 allows tracker application 402 of tracker 112 to identify and retrieve the data within updates 510 of XML file 509 that is important to tracker database 113. In turn, this data is important in what is reported to users 412. Further, this data may be used for further operations, as disclosed below.

Figure 6:
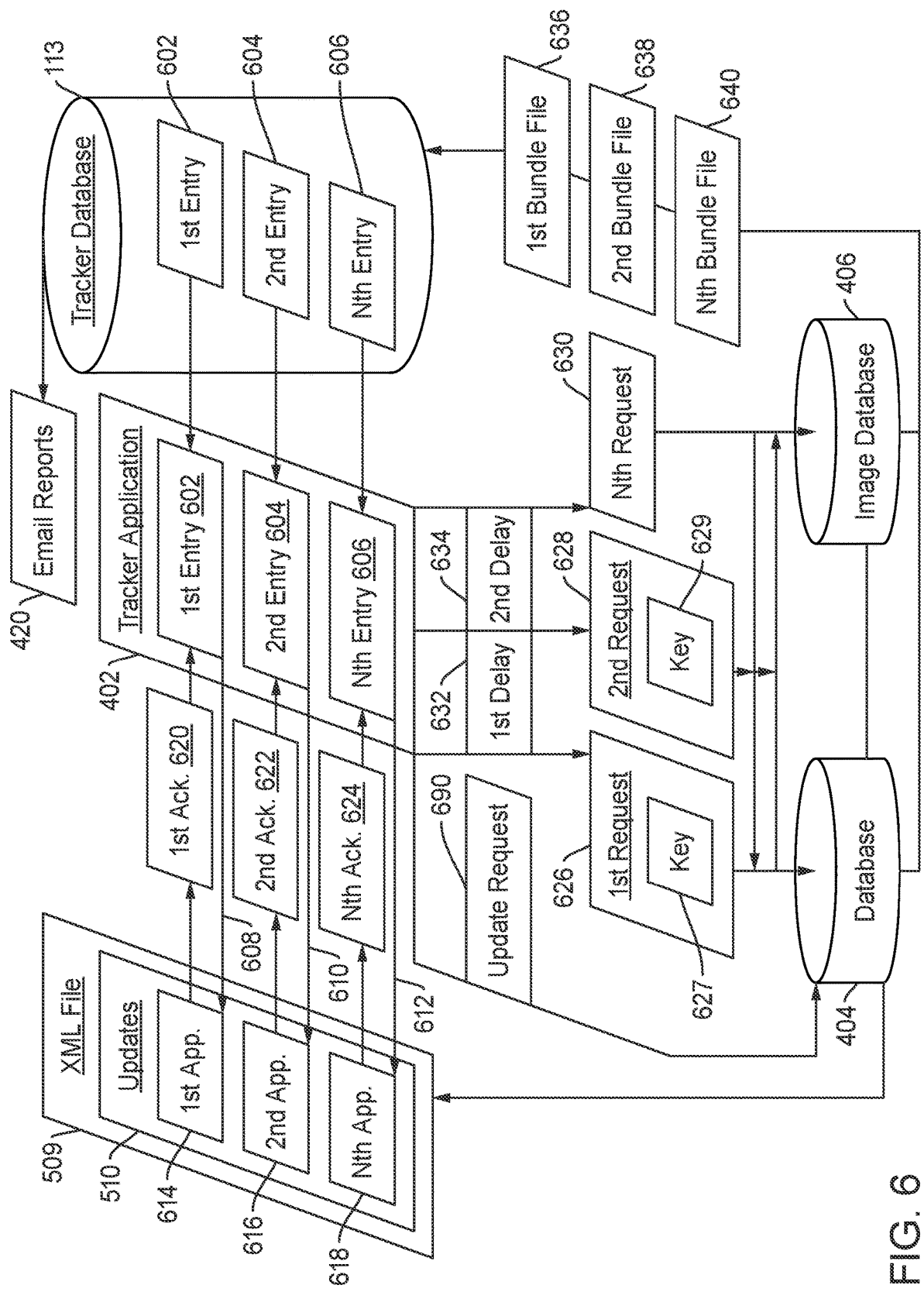
FIG. 6 illustrates a block diagram of retrieving changed data from third party databases based on updated data in a bundle file according to the disclosed embodiments.

FIG. 6 depicts a block diagram of retrieving changed data from third party databases based on updated data in an XML file according to the disclosed embodiments. The features disclosed by FIG. 6 may be applicable to the embodiments disclosed by FIGS. 1-5 but also may include new features or embodiments.

At a specified time, tracker device 110 will reach and download XML file 509 from a third party database. In some embodiments, tracker device 110 will send an update request 690 to the remote server having the databases. As shown in FIG. 6, database 404 and image database 406 may be third party databases having information publicly available from download. XML file 509 is a large file, up to 1 gigabyte or more. The disclosed embodiments ingest XML file 509 and import case updates within the file into tracker database 113. After unzipping and parsing through XML file 509, tracker 112 proceeds to download individual case bundle files from the third party databases, sometimes over 2000 files are downloaded.

These bundle files may include images in various formats, such as .jpg, .jpeg, .png, .bmp, .gif, and the like. They also contain individual case XML files that contain auxiliary status updates for each case. Auxiliary updates may include such data as point of contact/attorney of record, classification numbers, serial numbers, and the like. This XML file also may be in various formats. Tracker 110 handles the various different file formats both for images and for XML data.

This feature allows trackers to identify and update a large number of files within a database without unwieldy comparison operations or parsing through unusually large files. It also allows a third party, publicly available database to be queried and bundle files retrieved within unduly limiting access to the database. In other words, retrieval of a large number of files from the databases may not be considered a denial of service attack on the database and allows for other database operations to occur. The disclosed embodiments limit the resources needed to fulfill the update operations for the entries within a database. Finally, as the changed files are received, the disclosed embodiments send updates to users about the updated files of interest.

Tracker application 402 of tracker 112 imports entries from entries in tracker database 113. Each entry may correspond to a data model 502, disclosed above. As shown in FIG. 6, tracker database 113 includes first entry 602, second entry 604, up to Nth entry 606. There may be thousands of entries in tracker database 113. Entries may pertain to a particular client or matter, such as a pending trademark application, within the third party databases. These entries are provided to tracker application 402.

XML file 509 having updates 510 is accessed by tracker application 402 of tracker 112. XML file 509 may be provided to the public from databases 404 and 406. It may be provided or accessed at a specific time by tracker application 402. Tracker 112 may parse XML file 509 based on the entries within tracker database 113. Thus, tracker application 402 may query updates 510 using the entries. First query 608 may be sent for first entry 602. Second query 610 may be sent for second entry 604. Nth query 612 may be sent for Nth entry 606.

If update 510 includes data corresponding to the entry sending the query, then an acknowledgement may be provided to tracker application 402 that an update related to the entry occurred. Thus, tracker application 402 determines that first application 614 corresponding to first entry 602 is within updates 510 by first acknowledgement 620. Second application 616 corresponding to second entry 604 is within updates 510 as shown by second acknowledgement 622. Nth application 618 corresponding to Nth entry 606 also is within updates 510 as shown by Nth acknowledgement 624.

Not every entry within tracker database 113 will have a corresponding application within updates 510. For example, if no update occurred for second application 616, then it will not be included in updates 510. Second query 610 will not return any acknowledgement so that tracker application 402 will not take any further action to update second entry 604 within tracker database 113. Tracker application 402 may parse through updates 510 and identify all entries within tracker database 113 that have updates to their application files.

The disclosed embodiments then implement operations to retrieve bundle files from database 404 and image database 406. As opposed to just notifying a user that their application is updated, the disclosed embodiments also populate the tables and relationships with the updated information as well as provide the entirety of the updated information to the users. All of this is done automatically using tracker 112 and tracker database 113.

For each entry identified by tracker application 402, a request is sent to database 404 and image database 406 to retrieve individual bundle files corresponding to the identified entries. Thus, first entry 602 of tracker database 113 is acknowledged as being updated by first application 614 using tracker application 402 of tracker 112. Tracker application 402 generates first request 626, which is received by database 404 and image database 406. First request 626 is a call for the changed file corresponding to first application 614 within databases 404 and 406. The call requests that the databases provide the file data and images as first bundle file 636 to tracker database 113. First request may include an API key 627 to obtain the bundle file from the databases.

According to the disclosed embodiments, bundle files may contain mark images in various formats, such as .jpg, .jpeg, .png, .bmp, .gif, and the like. They also contain individual case XML files that include auxiliary status updates for each case, or application. Auxiliary updates include data such as point of contact (such as the attorney of record), classification information, serial numbers, or other data not directly related to the image data.

For example, the image data may show a trademark as a .jpeg photograph. The trademark is the basis for the application within databases 404 and 406, and an entry in tracker database 113. The bundle file will include one or more images provided to image database 406 as part of the trademark application. It also will include the auxiliary information disclosed above, in the XML file. The XML file also may include various formats. Tracker 112 handles the various different file formats both for mark images and XML data.

Second request 628 may generated for second entry 604 that includes updated information corresponding to second application 616. Second request 628 also includes API key 629. In some embodiments, API key 627 may differ from API key 629 to distinguish the information for the different bundle files. Each entry acknowledged as being changed by updates 510 will trigger a request to database 404 and image database 406, up to Nth request 630 being generated for Nth entry 606, as being updated by Nth application 618. Nth request 630 also may include its own API key.

Although first request 626, second request 628, and Nth request 630 are shown, the disclosed embodiments parse and process over two thousand bundle files to download. This feature results in possibly two thousand requests being received at database 404 and image database 406. Such a large number of requests may appear to be a denial of service attack, or may simply overtax the processing capabilities of the databases.

Referring back to FIG. 1, third party system 120 may include database 404 and image database 406, similar to remote database 122 having document retrieval data 124 and image retrieval 126. Third party system 120 may place a limit on data request throughput. If requests are received all at once, or too quickly, then third party system 120 may shut down the receipt of further requests. Tracker application 402 and tracker device 110 do not want this action to occur so as to get out updates in a timely manner.

The disclosed embodiments, therefore, enable a delay between requests. In some embodiments, this delay is 5-6 milliseconds. The delay makes the number of requests arrive in a reasonable manner Third party system 120 is not overwhelmed. Database 404 and image database 406 can process the requests to compile the bundle files in a reasonable manner. As shown in FIG. 6, a first delay 632 is placed between first request 626 and second request 628. These delays may be placed between subsequent requests up the Nth request 630. For example, second delay 634 may be placed between second request 628, as the next to last request, and Nth request 630.

First request 626, second request 628, and Nth request 630 may be separate API requests to database 404 and image database 406. Tracker application 402 may provide a key for the API request. The key may correspond to a power of attorney, or other authorization, to allow access to database 404 and image database 406 on behalf of the owner of the mark in the entry in tracker database 113. In other words, tracker application and tracker 112 provide an authorization with the request to get access to the updated records within the databases.

As a result of the requests, bundle files are generated and provided to tracker database 113. First bundle file 636 is generated in response to first request 626. Second bundle file 638 is generated in response to second request 628. Nth bundle file 640 is generated in response to Nth request 630. Tracker database 113 receives the bundle files and updates the corresponding entry to populate first table 504, second table 506, up to Nth table 508 based on relationships 507 for the data model in the entry. Thus, the image data and XML data of first bundle file 636 is used to update the tables or relationships of first entry 602. The image data and XML data of second bundle file 638 is used to update the tables or relationships of second entry 604. The image data and XML data of Nth bundle file 640 is used to update the tables or relationships of Nth entry 606. Tracker database 113 includes logic to handle the image data and XML data received in the bundle files.

In some embodiments, third party system 120 may be down such that database 404 and image database 406 will not respond to requests for the bundle files for the identified entries. Requests will result in an error. In these situations, the disclosed embodiments will pause until database 404 and image database 406 are available. As requests are sent by tracker 112 with tracker application 402, a pause may be implemented upon receipt of an error message from database 404 or image database 406. Tracker device 110 may "go to sleep" for a bit until the databases are back online.

For example, if first request 626 returns an error, then tracker application 402 may pause for 10 minutes. After the pause is completed, tracker application 402 may resend first request 626. This pause and resend operation may occur ten (10) times until an alert is provided by tracker database 113 to an operator or the users.

Tracking device 110 sends email reports 420 of status updates to the individual users. It also may create daily report files for tracker application 402, which may be provided as a web application to users. Email reports 420 may include the updates to the entries in tracker database 113. Email reports 420 may include different types of data and information pertaining to the file for that user.

Figure 7:
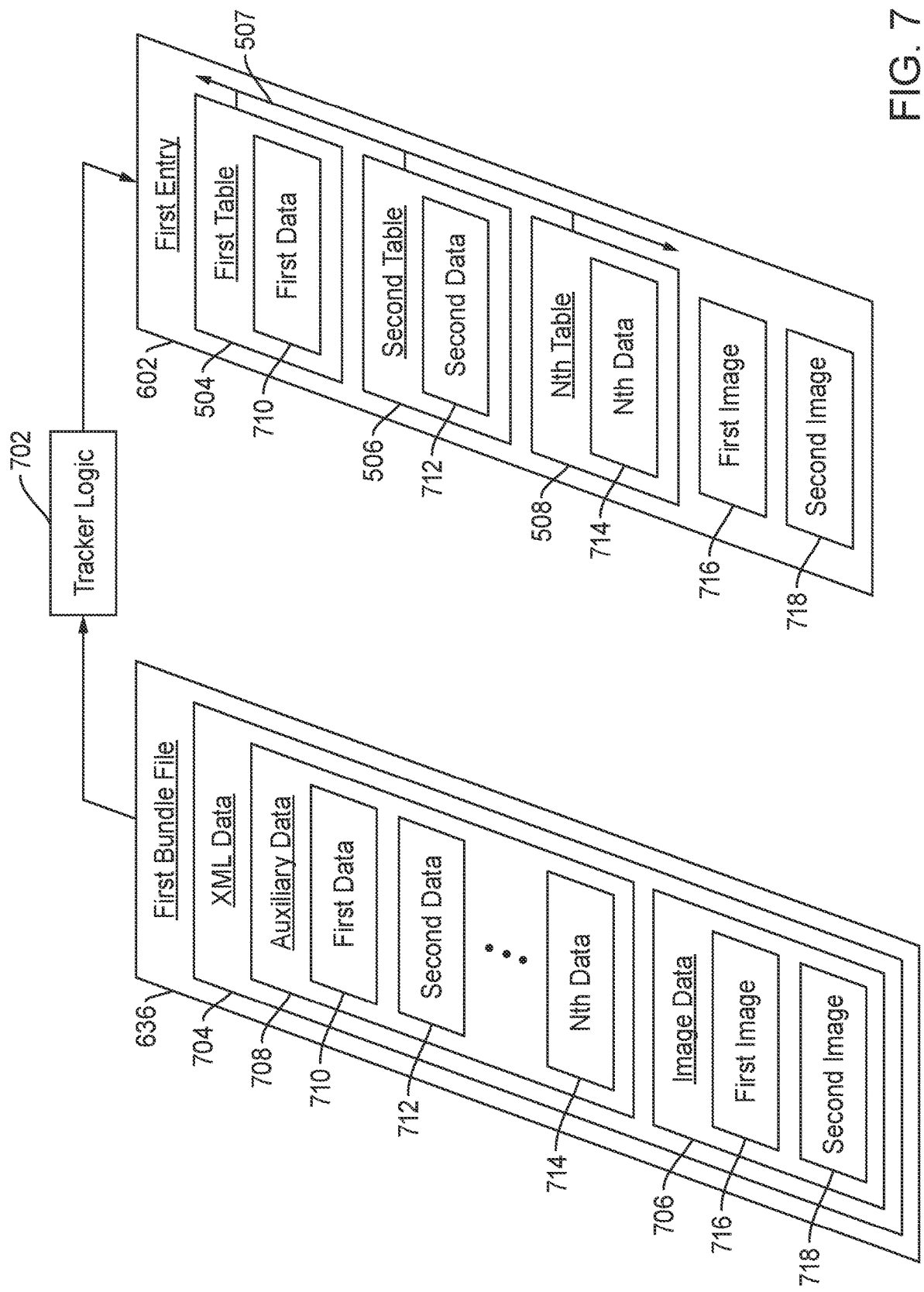
FIG. 7 illustrates a block diagram of a first bundle file updating a first entry in the tracker database according to the disclosed embodiments.

FIG. 7 depicts a block diagram of first bundle file 636 updating first entry 602 in tracker database 113 according to the disclosed embodiments. First bundle file 636 may be generated in response to first request 626 for compiling data and information related to first application 614. The embodiments disclosed in FIG. 7 also may apply to other bundle files received by tracker database 113, such as second bundle file 638 and Nth bundle file 640.

As disclosed above, first bundle file 636 include data from database 404 and image database 406. From database 404, XML data 704 may be provided. XML data 704 may be individual case XML files. XML data 704 includes auxiliary data 708 for first application 614 identified in updates 510 and within database 404. Examples of auxiliary data are disclosed above. Auxiliary data 708 includes updates for first entry 602 within tracker database 113. Updates may be shown as first data update 710, which may be a point of contact or attorney of record for first application 614. They also may include second data update 712, which may be a classification number for first application 614. Updates may go to Nth data update 714, which may be a serial number or other information corresponding to first application 614.

First bundle file 636 also includes image data 706. Image data 706 may be one or more images corresponding to first application 614 stored in image database 406. As disclosed above, the images may be in different formats and are not necessarily consistent between bundle files. Users of third party system 120 may store different types of images, videos, and the like in image database 406. First image 716 and second image 718 are provided. First image 716 may be an image of a logo or mark. Second image 718 may be an image of the logo or mark in use, such as on a product. First image 716 may be a .png file while second image 718 may be a .jpeg file.

Tracker logic 702 may take XML data 704 and image data 706 of first bundle file 636. Tracker logic 702 may identify what data needs to be updated within first entry 602. It also may identify the image format types for adding or updating the images within first entry 602. For example, tracker logic 702 may determine that first data update 710 belongs for data within first table 504. Thus, first data update 710 may be used to update the corresponding data field in first table 504. Second data update 712 may be used to update the corresponding data field in second table 506. Nth data update 714 may be used to update the corresponding data field in Nth table 508. Relationships 507 between the different tables also may be update or used to update other tables based on the relationships.

Not every table is updated within first entry 602 as not every update to first application 614 includes updates to everything. Tracker logic 702 ensures those fields that have updated data are modified. Further, relationships 507 enable the updates to modify tables in tracker database 113 that are impacted by update data. For example, second table 506 may have a relationship based on first table 504. First data update 710 may not only modify the corresponding data field in first table 504, but also a data field in second table 506. Thus, the data field in second table 506 also is updated accordingly.

Tracker logic 702 also may identify the different images within image data 706 to update first entry 602. First image 716 and second image 718 are used to update or replace images within first entry 602. These updates of XML data 704 and image data 706 also are used to populate the emails or messages sent from tracker device 110 to the users, shown as email reports 420. In some embodiments, only the updates are provided in the emails, such as first data update 710, second data update 712, Nth data update 714, first image 716, and second image 718. In other embodiments, first entry 602 may be provided in email reports 420. First entry 602 includes a table for the recipient's information for the email report of the recipient's applications.

Figure 8:
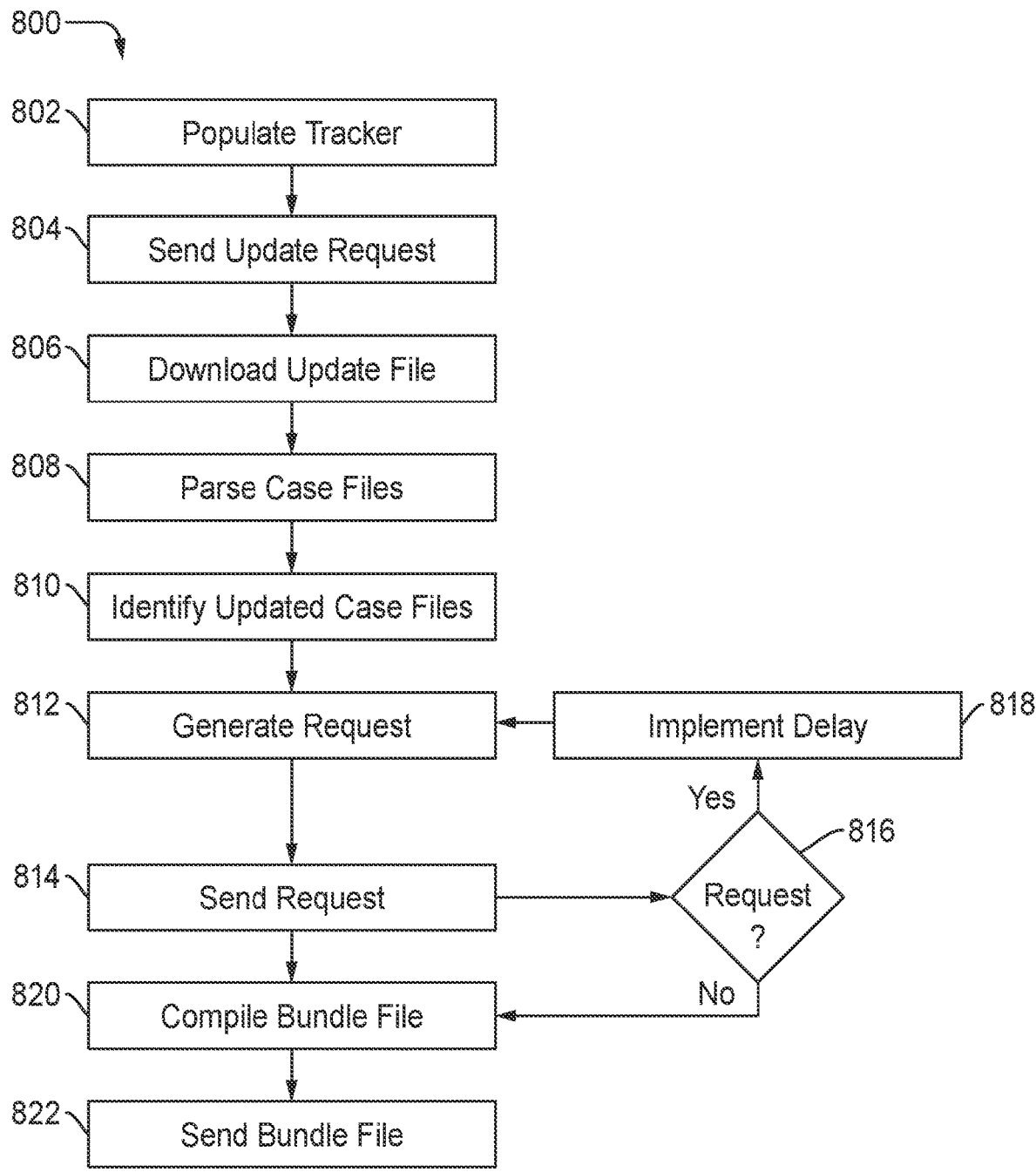
FIG. 8 illustrates a flowchart for managing data to create a bundle file for updates to a case file according to the disclosed embodiments.

FIG. 8 depicts a flowchart 800 for managing data to create a bundle file for updates to a case file according to the disclosed embodiments. Flowchart 800 may refer to FIGS. 1-7 for illustrative purposes. Flowchart 800, however, is not limited by the embodiments disclosed in FIGS. 1-7.

Step 802 executes by populating tracker 112 with entries from tracker database 113. Tracker 112 may query tracker database 113 to provide those entries within the database that will pertain to updates requested from the remote server. For example, tracker database 113 may include a plurality types of entries to query different remote servers for updates between different sets of data. Tracker database 113 provides the entries for the specific call to a corresponding remote server. As shown in FIG. 6, tracker application 402 of tracker 112 includes first entry 602, second entry 604, and Nth entry 606, which are also found in tracker database 113.

Step 804 executes by sending update request 690 from tracker 112 to remote server 120, which includes database 404 and image database 406. Update request 690 may include information related to what updates may be needed. Update request 690 may be sent at a specific time every day, such as 2 am, so that files may be downloaded when there is not much data traffic. Alternatively, update request 690 may be sent after an event occurs, such as a request from an operator to tracking device 110.

Step 806 executes by downloading XML file 509, which includes update file 510. These features are disclosed above. XML file 509 may be downloaded to tracker device 110. Alternatively, it may be downloaded into a data storage to be accessed by tracker 112. Step 808 executes by parsing the case files that are of interest by tracker 112 from update file 510. Case files may be shown as first application 614, second application 616, and Nth application 618 in FIG. 6. Cases files may correspond to case files at the remote server in database 404 and image database 406.

Step 810 executes by identifying the updated cases files due to the parsing of update file 510. Tracker 112 may correspond the applications or case files to entries from tracker database 113. As disclosed above, tracker 112 identifies those case files, or applications, that are within update file 510 that corresponds to entries within tracker database 113. Thus, first entry 602 corresponds to first application 614. A first acknowledgement 620 may be received by tracker 112 to indicate the updated case file. The same process may be performed for all the entries within tracker 112. Not every entry will correspond to a case file, or application, within update file 510.

Step 812 executes by generating a request for each entry having an updated case file, as identified above. For example, tracker 112 may generate first request 626 for first entry 602 identifying an update to its associated case file in the remote server via first application 614. First request 626 may include an API key 627. Step 814 executes by sending the request generated for the update to the remote server. In this instance, first request 626 may be sent to database 404 and image database 406.

Tracker 112 may send requests individually and not all at once. Thus, step 816 executes by determining whether a further request needs to be generated for an entry within tracker 112. If yes, then step 818 executes by implementing a delay within tracker 112. This delay may be 5-6 milliseconds. The delay prevents requests with their associated API keys being received at once by the remote server. The delay also helps avoid shutdowns or measures taken against bots crawling the network compiling information. Flowchart 800 then returns to step 812 to generate another request, such as second request 628, after the execution of first delay 632.

If step 816 is no, or just from step 814, then step 820 executes by compiling the bundle file associated with the API key of the request. For example, first bundle file 636 is compiled in response to first request 626 having API key 629. This feature is disclosed in greater detail above. Step 822 executes by sending the bundle file to tracking device 110. For example, first bundle file 636 is sent to tracking device 110. The remaining bundle files for subsequent requests may be compiled and sent to tracking device 110 until all updated case files are accounted for.

Figure 9:
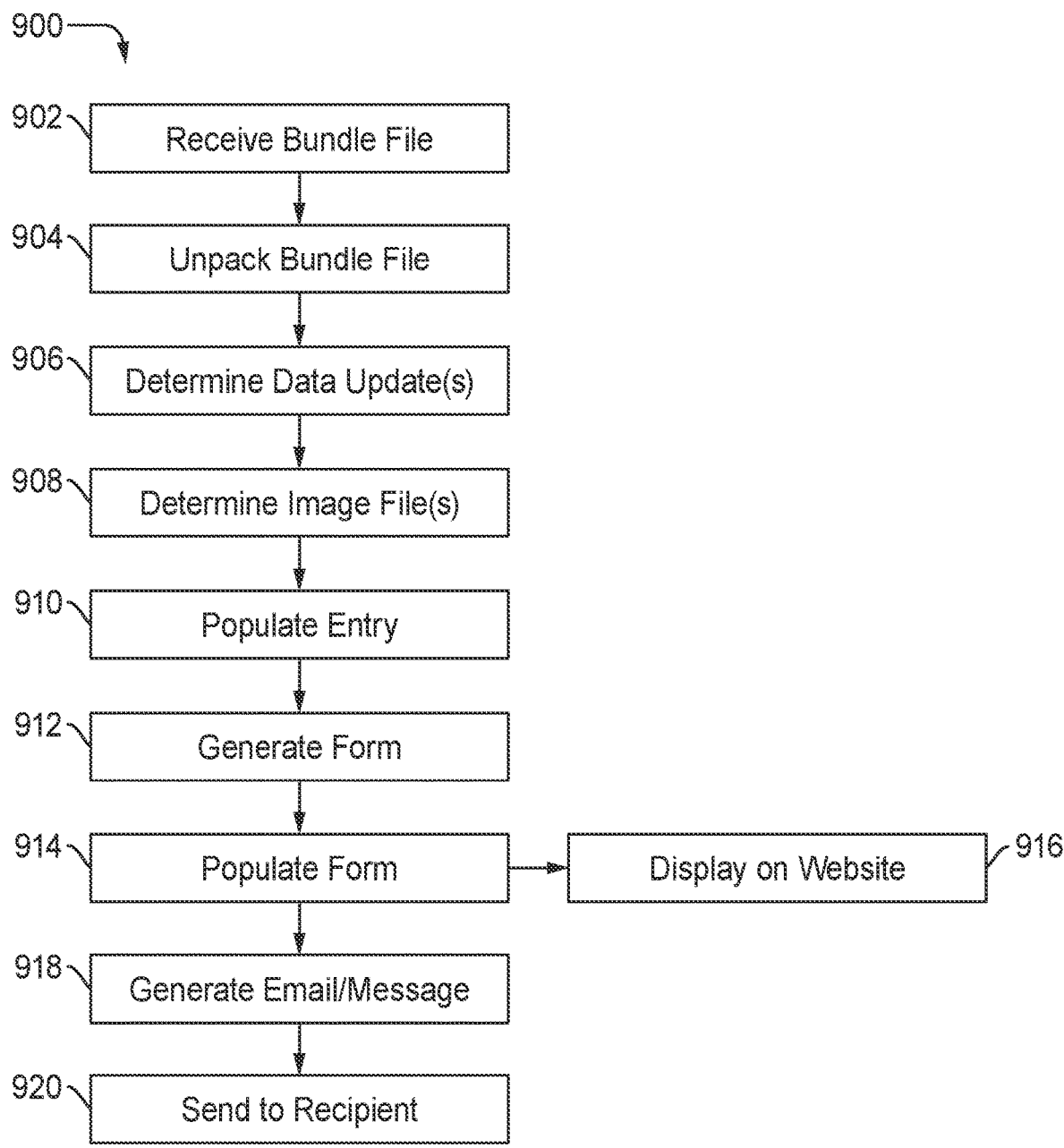
FIG. 9 illustrates a flowchart for providing a message or email regarding the updated case file according to the disclosed embodiments.

FIG. 9 depicts a flowchart 900 for providing a message or email regarding the updated case file according to the disclosed embodiments. Flowchart 900 may refer to FIGS. 1-8 for illustrative purposes. Flowchart 900, however, is not limited to the embodiments disclosed by FIGS. 1-8.

Step 902 executes by receiving a bundle file, such as the bundle file created in flowchart 800, at tracking device 110. For example, tracker 112 may receive first bundle file 636. Step 904 executes by unpacking the bundle file to determine one or more auxiliary files having data updates and one or more image files. Referring to FIG. 7, first bundle file 636 may include XML data 704 and image data 706. These components may include sub-components, namely first data update 710, second data update 712, and Nth data update 714 for XML data 704 and first image 716 and second image 718 for image data 706. The disclosed embodiments may use tracker logic 702 to unpack these data instances and files.

Step 906 executes by determining one or more data updates with auxiliary data 708. These updates should correspond to data within an entry within tracker database 113. For example, first data update 710, second data update 712, and Nth data update correspond to data fields within tables of first entry 602. Tracker logic 702 may determine that these updates are available for first entry 602.

Step 908 executes by determining one or more image files within first bundle file 636 to be added to an entry within tracker database 113. Using the above example, first image 716 and second image 718 may be associated with the case file corresponding to first entry 602. The disclosed embodiments provide these images.

Step 910 executes by populating the corresponding entry within tracker database 113 with the information determined from the bundle file. For example, first entry 602 is updated with first data update 710, second data update 712, and Nth data update 714, first image 716, and second image 718, as disclosed above. Tables may be updated with the data updates and based on the relationships between the tables.

Step 912 executes by generating an electronic form, such as user-accessible form 421 disclosed above. This form may include fields for data of interest to a user or operator. Form 421 may be configurable to include information from an entry within tracker database 113. Some information may be left out of the form. For example, form 421 may be configured to include information regarding first table 504 and second table 506, but not Nth table 508. Step 914 executes by populating the electronic form with data from the updated entry within tracker database 113. Using the above example, form 421 may include information regarding first data update 710 in first table 504 and second data update 712 in second table 506 along with first image 716 and second image 718. Nth data update 714 may be left off form 421 due to the user configured format.

Step 916 executes by displaying the electronic form on a website or web-based platform. The user may log onto a platform to review the information provided in the form, including updated data and images. Alternatively, step 918 executes by generating email or message 420 having the electronic form including the information configured therein. The disclosed embodiments populate the form within email 420 for sending to a recipient. Step 920 executes by sending the message or email to the recipient. Thus, a recipient may receive automatic updates on case files within large amounts of data in timely manner without overburdening a remote server or the network.

The disclosed embodiments track selected data stored in at least one database, compile the tracked data in a preset user-accessible form, upload the complied user-accessible form to an email or a cellular message, and send the email or the cellular message to subscribe users at a predetermined time. The selected data may include statuses of cases that are stored in a public database, such as database 122 of FIG. 1, and the users are interested watching. The selected data may also include information saved in a private database, such as database 132 of web server 130 of FIG. 1, that is accessible by authorized personnel and is relative to the cases the users are watching. For example, the private database may store email contents regarding a specific case, information of persons who are assigned to this specific case, calendars of these persons, and docket information of this specific case, etc. The system of the disclosed embodiments compiles all the tracked data including those from the public and the private databases into the pre-set user-accessible form. The form is then sent to the users at a predetermined time.

At least one benefit of the disclosed embodiments is that the user-accessible form is compiled and updated by the tracking system at a first predetermined time of day and is sent to the users immediately or at a second predetermined time of day. Therefore, the users receive the form, which may be a work docket, at the same time of a day, for example, 6 a.m. Based on the content of the form, the users can easily plan on their work priorities so that they will not overlook due dates of the cases they are working on.

Moreover, the tracking device according to the disclosed embodiments may compile the preset user-accessible form based on each user's profile so that each user can receive a form containing information relative to himself/herself only.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computing system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more content management systems coupled to a network capable of exchanging information and data. Various functions and components of the content management system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for managing data, the method comprising:
   downloading an update file from a remote server to a tracking device having a tracker and a tracker database, wherein the remote server includes a case file database and an image file database, and the case file database stores a plurality of bundle files that corresponds to a plurality of case files;
   parsing the update file using the tracker, wherein the tracker includes a number of entries used to identify a number of case files within the update file, the number of entries includes a first entry used to identify a first case file within the update file, and
   wherein the first entry also is found within the tracker database;
   identifying the first case file within the update file using the first entry;
   generating a request for the first entry that corresponds to the first case file within the update file;

sending a first request from the tracker to the remote server having the case file database and the image file database, wherein the first request includes information associated with the first entry;

receiving a first bundle file of the first case file in the case file database in response to the first request, wherein the first bundle file includes XML data from the case file database and image data corresponding to the first case file from the image file database;

populating the first entry in the tracker database with the XML data and the image data within the first bundle file;

populating an electronic form with the XML data and the image data;

sending an electronic notification including the electronic form having the XML data and the image data, and if a second request is generated for a second entry that corresponds to a second case file within the update file, sending the second request after a predetermined delay after the first request is sent.

2. The method of claim 1, wherein the remote server is a public server.

3. The method of claim 1, further comprising updating a field within the first entry with the XML data or the image data of the first bundle file.

4. The method of claim 1, wherein the image data includes a first image having a first format and a second image having a second format.

5. The method of claim 4, wherein the first format of the first image differs from the second format of the second image.

6. The method of claim 1, wherein the update file is an XML file.

7. The method of claim 1, wherein parsing the update file using the tracker includes using a second entry to identify a second case file within the update file and wherein the second entry is found within the tracker database.

8. The method of claim 7, further comprising identifying the second case file within the update file using the second entry.

9. The method of claim 8, further comprising sending a second request from the tracker to the case file database and the image file database, wherein the second request includes information associated with the second entry.

10. The method of claim 9, further comprising delaying the sending of the second request by a time period after the first request is sent.

11. The method of claim 1, wherein the first request includes an application programming interface (API) call to the case file database and the image database, wherein the API call includes a key to access the first case file.

12. The method of claim 1, wherein sending the electronic notification includes sending an email having the electronic form to an email recipient.

13. The method of claim 1, wherein sending the electronic notification includes sending an electronic message having the electronic form to a client device.

14. A data management system comprising:
a processor;
a memory connected to the processor, the memory storing instructions that, when executed on the processor, configure the data management system to
download an update file from a remote server to a tracking device having a tracker and a tracker database, wherein the remote server includes a case file database and an image file database, and the case file database stores a plurality of bundle files that corresponds to a plurality of case files;

parse the update file using the tracker, wherein the tracker includes a number of entries used to identify a number of case files within the update file, the number of entries includes a first entry used to identify a first case file within the update file, and wherein the first entry also is found within the tracker database;

identify the first case file within the update file using the first entry;

generating a request for the first entry that corresponds to the first case file within the update file;

send a first request from the tracker to the remote server having the case file database and the image file database, wherein the first request includes information associated with the first entry;

receive a first bundle file of the first case file in the case file database in response to the first request, wherein the first bundle file includes XML data from the case file database and image data corresponding to the first case file from the image file database;

populate the first entry in the tracker database with the XML data and the image data within the first bundle file;

populate an electronic form with the XML data and the image data;

send an electronic notification including the electronic form having the XML data and the image data, and if a second request is generated for a second entry that corresponds to a second case file within the update file, sending the second request after a predetermined delay after the first request is sent.

15. The data management system of claim 14, wherein the instructions further configure the data management system to parse the update file with the tracker using a second entry to identify a second case file within the update file and wherein the second entry is found within the tracker database.

16. The data management system of claim 15, wherein the instructions further configure the data management system to identify the second case file within the update file using the second entry.

17. The data management system of claim 16, wherein the instructions further configure the data management system to send a second request from the tracker to the case file database and the image file database, wherein the second request includes information associated with the second entry.

18. The data management system of claim 17, wherein the instructions further configure the data management system to delay the sending of the second request by a time period after the first request is sent.

19. The data management system of claim 14, wherein the update file is an XML file having a data size greater than one gigabyte.

20. A data management method comprising:
sending an update request to a remote server from a tracking device at a specified time, wherein the remote server includes a case file database and an image file database;

downloading an update file in response to the update request from the remote server to the tracking device, wherein the tracking device includes a tracker and a tracker database and a data size of the update file is greater than 1 gigabyte;

parsing a plurality of case files in the update file using the tracker, wherein the tracker includes a plurality of entries to identify a set of the plurality of case files and wherein the plurality of entries is found within the tracker database;

generating a first request for a first entry within the plurality of entries that corresponds to a first case file of the set of case files identified from the update file by the tracker;

generating a second request for a second entry within the plurality of entries that corresponds to a second case file of the set of cases identified from the update by the tracker;

sending a first request from the tracker to the remote server having the case file database and the image file database, wherein the first request includes a first key to access the first case file at the remote server;

implementing a delay after the first request is sent to the remote server;

after the delay, sending a second request from the tracker to the remote server having the case file database and the image file database, wherein the second request includes a second key to access the second case file at the remote server;

receiving a first bundle file of the first case file in the case file database in response to the first request and the first key, wherein the first bundle file includes XML data from the case file database and image data corresponding to the first case file from the image file database;

receiving a second bundle file of the second case file in the case file database in response to the second request and the second key, wherein the second bundle file includes XML data from the case file database and image data corresponding to the second case file from the image file database, and wherein the XML data and the image data of the first bundle file differ from the XML data and the image data of the second bundle file;

populating the first entry in the tracker database with the XML data and the image data within the first bundle file;

populating a second entry in the tracker database with the XML data and the image data within the second bundle file;

generating a first electronic form with the XML data and the image data within the first bundle file;

generating a second electronic form with the XML data and the image data within the second bundle file;

sending a first electronic notification including the first electronic form having the XML data and the image data within the first bundle file to a first recipient; and sending a second electronic notification including the second electronic form having the XML data and the image data within the second bundle file to a second recipient, where the first recipient differs from the second recipient.

* * * * *